United States Patent
Tang et al.

(10) Patent No.: US 9,495,619 B2
(45) Date of Patent: Nov. 15, 2016

(54) SYSTEMS AND METHODS FOR IMAGE OBJECT RECOGNITION BASED ON LOCATION INFORMATION AND OBJECT CATEGORIES

(71) Applicant: Facebook, Inc., Menlo Park, CA (US)

(72) Inventors: Kevin Dechau Tang, Stanford, CA (US); Lubomir Bourdev, Mountain View, CA (US); Balamanohar Paluri, Menlo Park, CA (US); Robert D. Fergus, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 125 days.

(21) Appl. No.: 14/586,033

(22) Filed: Dec. 30, 2014

(65) Prior Publication Data

US 2016/0189010 A1 Jun. 30, 2016

(51) Int. Cl.
*G06K 9/00* (2006.01)
*G06K 9/66* (2006.01)
*G06N 3/08* (2006.01)
*G06K 9/62* (2006.01)
*G06K 9/46* (2006.01)
*G06K 9/52* (2006.01)

(52) U.S. Cl.
CPC ............. *G06K 9/66* (2013.01); *G06K 9/00476* (2013.01); *G06K 9/4642* (2013.01); *G06K 9/52* (2013.01); *G06K 9/6256* (2013.01); *G06K 9/6267* (2013.01); *G06N 3/08* (2013.01); *G06K 2009/4666* (2013.01)

(58) Field of Classification Search
None
See application file for complete search history.

(56) References Cited

U.S. PATENT DOCUMENTS

| 5,751,910 A | 5/1998 | Bryant et al. | |
| 6,671,391 B1* | 12/2003 | Zhang | G06K 9/00228 382/118 |
| 8,756,183 B1 | 6/2014 | Daily et al. | |
| 9,129,190 B1* | 9/2015 | Ranzato | G06K 9/6257 |
| 2010/0332475 A1 | 12/2010 | Birdwell et al. | |
| 2014/0172643 A1* | 6/2014 | Fazl Ersi | G06K 9/4642 705/26.64 |

* cited by examiner

*Primary Examiner* — Shefali Goradia
(74) *Attorney, Agent, or Firm* — Sheppard Mullin Richter & Hampton LLP

(57) ABSTRACT

Systems, methods, and non-transitory computer-readable media can identify a set of regions corresponding to a geographical area. A collection of training images can be acquired. Each training image in the collection can be associated with one or more respective recognized objects and with a respective region in the set of regions. Histogram metrics for a plurality of object categories within each region in the set of regions can be determined based at least in part on the collection of training images. A neural network can be developed based at least in part on the histogram metrics for the plurality of object categories within each region in the set of regions and on the collection of training images.

20 Claims, 11 Drawing Sheets

600

```
┌─────────────────────────────────────────────────────────────────────────┐
│ Generate a table representing histogram metrics for a plurality of     │
│ object categories within each region in a set of regions                │
│                              602                                        │
└─────────────────────────────────────────────────────────────────────────┘
                                    │
                                    ▼
┌─────────────────────────────────────────────────────────────────────────┐
│ Providing, within a neural network, a location layer associated with   │
│ the table                                                               │
│                              604                                        │
└─────────────────────────────────────────────────────────────────────────┘
                                    │
                                    ▼
┌─────────────────────────────────────────────────────────────────────────┐
│ Train the neural network based at least in part on a collection of     │
│ training images                                                         │
│                              606                                        │
└─────────────────────────────────────────────────────────────────────────┘
```

FIGURE 6A

SYSTEMS AND METHODS FOR IMAGE OBJECT RECOGNITION BASED ON LOCATION INFORMATION AND OBJECT CATEGORIES

FIELD OF THE INVENTION

The present technology relates to the field of media processing. More particularly, the present technology relates to techniques for image object recognition based on location information and object categories.

BACKGROUND

Today, people often utilize computing devices or systems for a wide variety of purposes. For example, users can use their computing devices (or systems) to interact with one another, create content, share information, and access information. In some instances, a user of a computing device can utilize a camera or other image sensor of the computing device to capture or record media content, such as image content.

In some instances, under conventional approaches, media content such as images can be analyzed in attempt to identify objects represented or included in the images. For example, conventional facial detection and recognition techniques can be utilized to determine that a face of a user is captured, included, or represented in an image and determine an identity of the user in the image. In another example, conventional object detection and recognition approaches can detect and recognize objects captured, included, or represented in images. However, in some cases, conventional approaches can be inaccurate, ineffective, and inefficient. Due to these and other reasons, conventional approaches related to media processing can create challenges for or reduce the overall user experience associated with recognizing objects in media content.

SUMMARY

Various embodiments of the present disclosure can include systems, methods, and non-transitory computer readable media configured to identify a set of regions corresponding to a geographical area. A collection of training images can be acquired. Each training image in the collection can be associated with one or more respective recognized objects and with a respective region in the set of regions. Histogram metrics for a plurality of object categories within each region in the set of regions can be determined based at least in part on the collection of training images. A neural network can be developed based at least in part on the histogram metrics for the plurality of object categories within each region in the set of regions and on the collection of training images.

In an embodiment, the developing of the neural network can further comprise generating a table representing the histogram metrics for the plurality of object categories within each region in the set of regions. A location layer can be provided within the neural network. The location layer can be associated with the table. The neural network can be trained based at least in part on the collection of training images.

In an embodiment, location information associated with a particular image to be inputted into the neural network can be acquired. The particular image and the location information associated with the particular image can be inputted into the neural network. The neural network can be caused to produce, based at least in part on the location information associated with the particular image, a predicted object recognition output for the particular image.

In an embodiment, a preferred radius associated with each object category in the plurality of object categories can be determined based at least in part on the training of the neural network.

In an embodiment, each region in the set of regions can be associated with a portion of the neural network via a respective connection in a group of connections. Each connection in the group of connections can have a respective weight.

In an embodiment, the developing of the neural network can include training the neural network. The training of the neural network can include modifying the respective weight of each connection in the group of connections. The modifying of the respective weight of each connection in the group of connections can cause the neural network to produce a predicted object recognition output, for a particular training image, that is closer to one or more recognized objects associated with the particular training image.

In an embodiment, the one or more respective recognized objects associated with each training image can be recognized based at least in part on at least one of: 1) an image classification process applied to each training image or 2) one or more respective hashtags provided for each training image.

In an embodiment, the respective region associated with each training image can be determined based at least in part on acquiring respective location information for each training image and identifying the respective region corresponding to the respective location information.

In an embodiment, the respective location information for each training image can include Global Positioning System (GPS) data indicating where each training image was captured.

In an embodiment, the histogram metrics for the plurality of object categories within each region in the set of regions can be normalized. The histogram metrics can be normalized based at least in part on at least one of: 1) a first ratio of a first object quantity for a particular object category within each region relative to a second object quantity for all object categories in the plurality of object categories within each region or 2): a second ratio of the first object quantity for the particular object category within each region relative to a third object quantity for the particular object category within all regions in the set of regions.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 6A illustrates an example method associated with image object recognition based on location information and object categories, according to an embodiment of the present disclosure.

Figure 1:
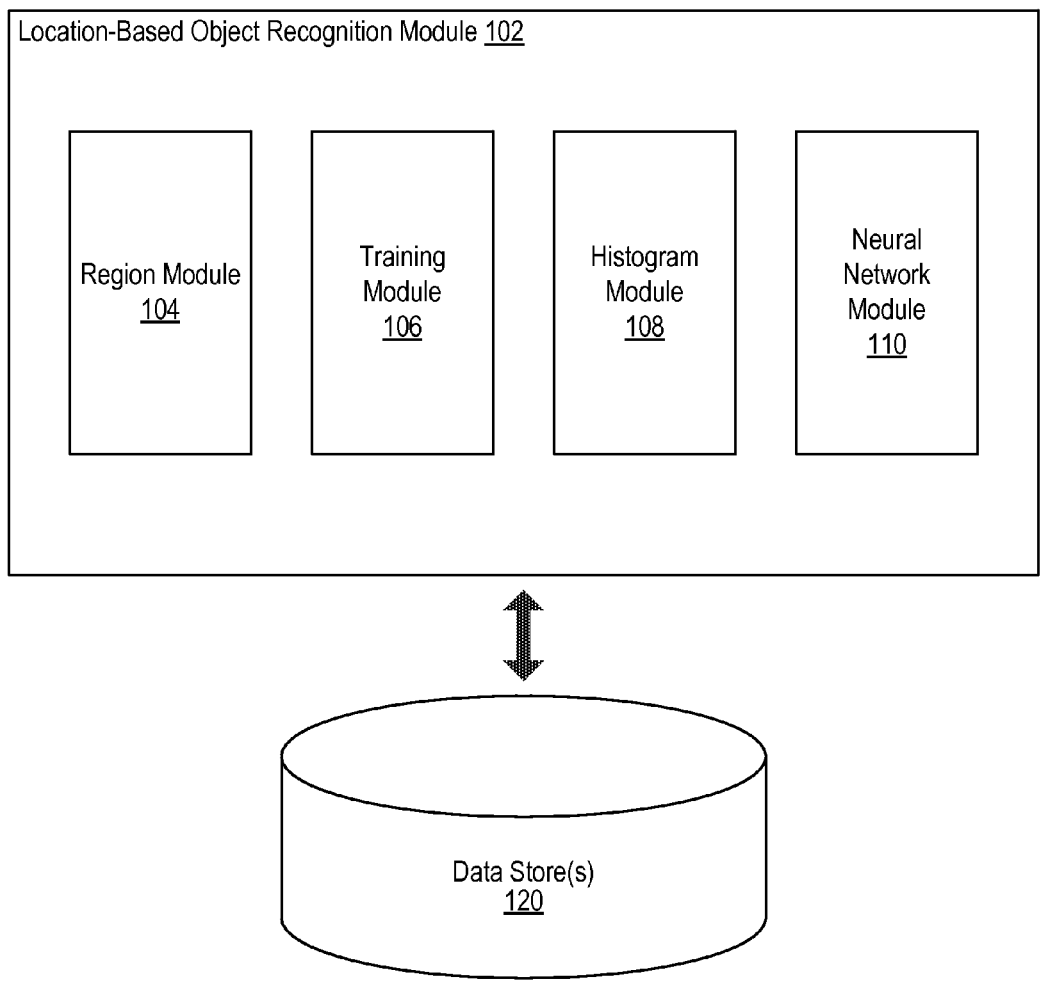
FIG. 1 illustrates an example system including an example location-based object recognition module configured to facilitate image object recognition based on location information and object categories, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Image Object Recognition Based on Location Information and Object Categories

People use computing devices or systems for a wide variety of purposes. Computing devices can provide different kinds of functionality. Users can utilize their computing devices to produce information, access information, and share information. In some cases, computing devices can include or correspond to cameras capable of capturing or recording media content, such as images (including video image frames or still frames).

In some instances, an image can include one or more objects. Examples of objects within images can include, but are not limited to, users, user faces, cats, dogs, plants, products, vehicles, vessels, structures, landmarks, and various other items or item portions. Conventional approaches associated with image processing can, in some cases, attempt to identify or predict what the objects are. In some cases, conventional approaches can take into consideration scalar values representing Global Positioning System (GPS) coordinates (or longitudinal and latitudinal coordinates) that indicate where images were taken. Such conventional approaches can directly input the scalar GPS coordinate values of the images into a neural network in attempt to have the scalar GPS coordinate values assist in identifying objects included within the images. However, these conventional approaches can be ineffective because there can be numerous variations in the GPS coordinates, such that minor variances in the GPS coordinates can cause inconsistent or undesirably varying results.

Moreover, in some cases, conventional approaches can attempt to perform object recognition for images by utilizing a neural network and keeping track of every object at every specified location or subarea within a given area. However, such conventional approaches can require significant data storage and computing resources and can thus be inefficient. As such, these and other similar conventional approaches can be inaccurate, ineffective, and inefficient.

Therefore, an improved approach can be beneficial for addressing or alleviating various concerns associated with conventional approaches. The disclosed technology can provide image object recognition based on location information and object categories. In one example, the disclosed technology can encode contexts around objects rather than consume significant computational and data resources to encode locations or subareas associated with the objects. Various embodiments of the present disclosure can identify a set of regions corresponding to a geographical area. A collection of training images can be acquired. Each training image in the collection can be associated with one or more respective recognized objects and with a respective region in the set of regions. Histogram metrics for a plurality of object categories within each region in the set of regions can be determined based at least in part on the collection of training images. A neural network can be developed based at least in part on the histogram metrics for the plurality of object categories within each region in the set of regions and on the collection of training images. It is contemplated that there can be many variations and/or other possibilities.

FIG. 1 illustrates an example system 100 including an example location-based object recognition module 102 configured to facilitate image object recognition based on location information and object categories, according to an embodiment of the present disclosure. As shown in the example of FIG. 1, the example location-based object recognition module 102 can include a region module 104, a training module 106, a histogram module 108, and a neural network module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the location-based object recognition module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the location-based object recognition module 102 can be implemented, in part or in whole, as software running on one or more computing devices or systems, such as on a user or client computing device. In one example, the location-based object recognition module 102 or at least a portion thereof can be implemented as or within an application (e.g., app), a program, or an applet, etc., running on a user computing device or a client computing system, such as the user device 710 of FIG. 7. In another example, the location-based object recognition module 102 or at least a portion thereof can be implemented using one or more computing devices or systems that include one or more servers, such as network servers or cloud servers. In some instances, the location-based object recognition module 102 can, in part or in whole, be implemented within or configured to operate in conjunction with a social networking system (or service), such as the social networking system 730 of FIG. 7.

The region module 104 can be configured to facilitate identifying a set of regions corresponding to a geographical area. In some implementations, the region module 104 can divide a given geographical area, such as a continent, country, state, province, county, city, district, etc., into a set of regions (also referred to as "cells"). In one example, the region module 104 can divide the United States into multiple regions (or cells) where each region has a surface area of 100 meters by 100 meters. In another example, the geographical area can correspond to the city of San Francisco and the multiple regions can each be 1 mile by 1 mile. It should be appreciated that these examples are provided for illustrative purposes and that any suitable unit (e.g., length, width, square area, etc.) can be utilized. There can be many variations and other possibilities.

The training module 106 can be configured to facilitate acquiring a collection of training images. Each training image in the collection can be associated with one or more respective recognized objects and with a respective region in the set of regions. In some implementations, the training module 106 can acquire the collection of training images from one or more sources such as one or more third party systems or services. In one example, the training module 106 can acquire the collection of training images from a third party image service. The training images can each be associated with one or more hashtags provided by users of the third party image service. The hashtag(s) for a particular training image can, for example, be provided by the user who produced and/or uploaded that particular image. The hashtag(s) for each particular training image can be utilized to recognize objects included within or represented by the particular image. A user who uploaded an image of a cat can provide a hashtag "#cat", and the hashtag "#cat" can be utilized to recognize that the image includes a cat object. Moreover, in some implementations, other approaches can be utilized to recognize objects within the training images.

In another example, classification analysis can be performed on images to determine their potential relevance with a particular object, subject, topic, or theme. The classification analysis can be based on myriad techniques, for instance. The images can be analyzed and classified based on any suitable processing technique. In one example, an image classification process or technique can gather contextual cues for the images and use the contextual cues to generate a learning set of images. The learning set of images can be used to train a classifier to generate visual pattern templates of an image class (or a category of objects). The classifier can score an evaluation set of images based on correlation with the visual pattern templates. The highest scoring images of the evaluation set of images can be deemed to be mostly closely related to the image class. As another example, a hint detection technique can include natural language processing (NLP) to assist in identifying hints in comments associated with an image. The NLP-based hint detection technique can identify, based at least in part on natural language processing, one or more tokens in a comment that can assist in determining the subject matter(s) or object(s) of the image. It should be understood that other suitable techniques can be used and that many variations are possible.

Moreover, each training image in the collection can be associated with a respective region in the set of regions identified by the region module 104. In some cases, the training module 106 can determine the respective region associated with each training image based (at least in part) on acquiring respective location information for each training image and identifying the respective region corresponding to the respective location information. For example, the respective location information for each training image can include Global Positioning System (GPS) data indicating where each training image was captured. In this example, the training module 106 can acquire respective GPS coordinates tagged with each training image at the time each training image was captured. The training module 106 can then identify or look up the respective region corresponding with or encompassing the location indicated by the GPS coordinates. Accordingly, the training module 106 can determine the respective region associated with each training image. In another example, the respective location information for each training image can include one or more location tags indicating where each training image was captured. Again, it is contemplated that many variations are possible.

Furthermore, in some embodiments, the collection of training images can be stored, at least temporarily, at the at least one data store 120. In some instances, the location-based object recognition module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user specified settings, content produced or posted by users, and various other types of user data. In some embodiments, the at least one data store 120 can store information related to the collection of training images, which can be utilized by the training module 106. The information related to the collection of training images can include, but is not limited to, data representing the training images, identifiers (e.g., hashtags) for recognized objects within the training images, as well as location information indicating the respective region with which each training image is associated.

The histogram module 108 can be configured to facilitate determining, based at least in part on the collection of training images, histogram metrics for a plurality of object categories within each region in the set of regions. More details regarding the histogram module 108 will be provided below with reference to FIG. 2A.

Object categories can refer to types, classes, and/or kinds of objects. Object categories can also be known as "concepts". In some cases, object categories (or "concepts") can be predefined, preset, or specified. For example, multiple different cats, each recognized in a different image, can belong to or be a part of a cat object category. In another example, multiple different bridges, each recognized in a different image, can belong to or be a part of a bridge object category. In a further example, different images can capture or include the Golden Gate Bridge (or at least a portion thereof), and a respective Golden Gate Bridge object can be recognized for each image. In this example, each respective Golden Gate Bridge object associated with each different image can belong to or be a part of a Golden Gate Bridge object category.

In addition, the neural network module 110 can be configured to facilitate developing a neural network based at least in part on the histogram metrics for the plurality of object categories within each region in the set of regions and on the collection of training images. The neural network module 110 will be described in more detail below with reference to FIG. 2B.

In some implementations, the location-based object recognition module 102 can utilize the developed neural network to recognize objects within a given image using (at least in part) location information associated with the given image. In one example, the location-based object recognition module 102 can acquire location information (e.g., GPS coordinates, longitudinal and latitudinal coordinates, etc.) associated with a particular image to be inputted into the neural network. The particular image and the location information associated with the particular image can be inputted, by the location-based object recognition module 102, into the neural network. The location-based object recognition module 102 can cause the neural network to produce, based at least in part on the location information associated with the particular image, a predicted object recognition output for the particular image. The predicted object recognition output can indicate, for each of one or more particular object categories, a respective likelihood that the particular image includes an object from that particular object category (e.g., 30% cat, 10% dog, 2% bridge, and so forth). In some instances, the particular image can correspond to a given image for which one or more objects (if any) within the image are to be recognized. Furthermore, in some cases, the particular image can correspond to a testing image useful for further modifying, refining, and/or developing the neural network. Many variations are possible.

Figure 2A:
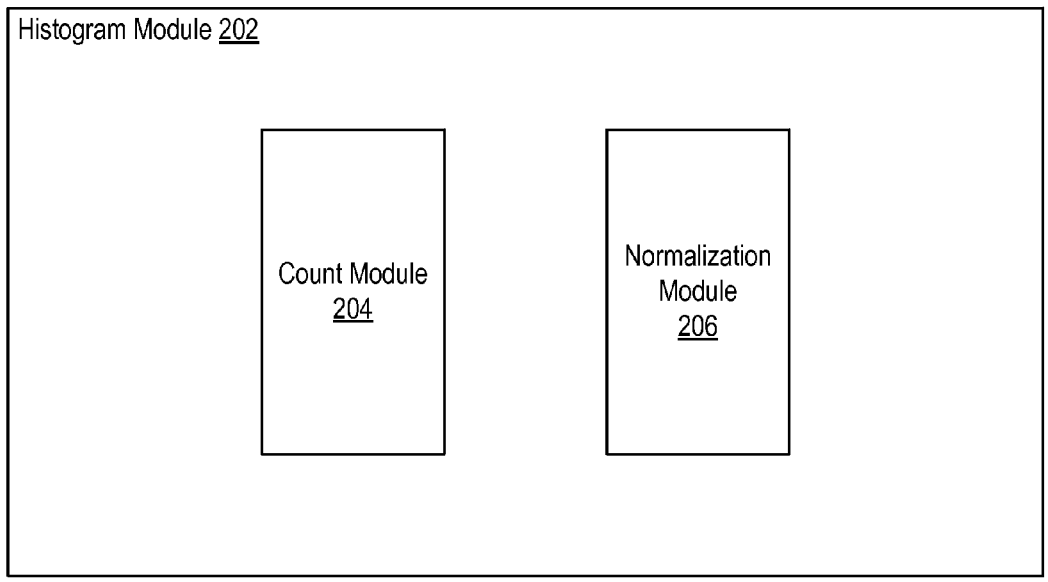
FIG. 2A illustrates an example histogram module configured to facilitate image object recognition based on location information and object categories, according to an embodiment of the present disclosure.

FIG. 2A illustrates an example histogram module 202 configured to facilitate image object recognition based on location information and object categories, according to an embodiment of the present disclosure. In some embodiments, the histogram module 108 of FIG. 1 can be implemented as the example histogram module 202. As shown in FIG. 2A, the example histogram module 202 can include a count module 204 and a normalization module 206.

As discussed previously, the histogram module 202 can be configured to facilitate determining, based at least in part on the collection of training images, histogram metrics for a plurality of object categories within each region in the set of regions. In some implementations, the histogram module 202 can utilize the count module 204 to determine histogram counts for the plurality of object categories within each region. For example, for each particular region (or "cell"), the count module 204 can calculate and keep track of a respective histogram count for that particular region. The respective histogram count for that particular region can indicate an amount of objects that have been recognized in the training images produced within that particular region.

In one example, based on location information (e.g., GPS data), it can be determined that 100 images were taken or uploaded in Region A of Geographical Area AB. Moreover, based on hashtags for the images, it can be determined that 54 of those images included recognized car objects, 31 of the images included recognized cat objects, 27 of the images included recognized dog objects, and so forth. Accordingly, the count module 204 can indicate that Region A's histogram count for the car object category is 54, that Region A's histogram count for the cat object category is 31, that Region A's histogram count for the dog object category is 27, and so forth. Continuing with this example, 200 images can be determined to have been produced in Region B of Geographical Area AB. 123 of the images in Region B included car objects, 34 of the images included cat objects, 63 of the images included dog objects, and so forth. As such, the Region B histogram count for the car object category is 123, the Region B histogram count for the cat object category is 34, the Region B histogram count for the dog object category is 63, and so forth. It should be understood that this example is provided for illustrative purposes and that many variations are possible.

In some implementations, the normalization module 206 can facilitate normalizing the histogram metrics for the plurality of object categories within each region in the set of regions. In some instances, the normalization module 206 can normalize the histogram metrics based at least in part on a first ratio of a first object quantity for a particular object category within each region relative to a second object quantity for all object categories in the plurality of object categories within each region. In one example, the histogram metrics of Region A for the car object category can correspond to 54 car objects relative to the sum of all objects in Region A (e.g., 55 car objects, 31 cat objects, and 27 dog objects). As such, in this example, the normalized Region A histogram metrics for the car object category can correspond to a ratio of 54/112 or approximately 0.48. The Region A histogram metrics for the cat object category, the dog object category, etc., can be similarly determined.

In some cases, the normalization module 206 can normalize the histogram metrics based at least in part on a second ratio of the first object quantity for the particular object category within each region relative to a third object quantity for the particular object category within all regions in the set of regions. In another example, the histogram metrics of Region A for the car object category can correspond to 54 car objects in Region A relative to the sum of all car objects in Geographical Area AB (e.g., 54 car objects in Region A and 123 car objects in Region B). Accordingly, in this example, the Region A histogram metrics for the car object category can correspond to a ratio of 54/177 or approximately 0.31. The Region A histogram metrics for the cat object category, the dog object category, etc., can be similarly determined. It should be appreciated that these examples are provided for illustrative purposes and that many variations are possible.

Additionally, in some embodiments, the histogram metrics (e.g., histogram counts, histogram values, etc.) for each region can be stored in and/or represented by a respective array. Elements in arrays can correspond to object categories. For example, the first element of an array for a particular region can store a value corresponding to an amount of objects in the car object category within the particular region, while a second element of the array can store a value corresponding to an amount of objects in the cat object category within the particular region, whereas a third element can store a value corresponding to an amount of objects in the dog object category within the particular region, and so forth. It should be understood that there can be many other possibilities and variations.

Figure 2B:
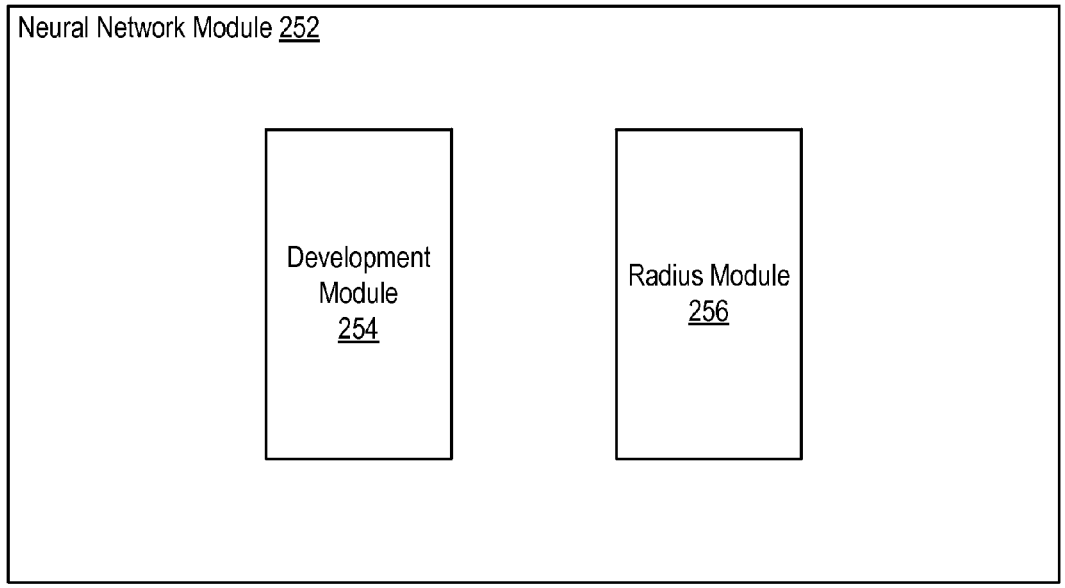
FIG. 2B illustrates an example neural network module configured to facilitate image object recognition based on location information and object categories, according to an embodiment of the present disclosure.

FIG. 2B illustrates an example neural network module 252 configured to facilitate image object recognition based on location information and object categories, according to an embodiment of the present disclosure. In some embodiments, the neural network module 110 of FIG. 1 can be implemented as the example neural network module 252. As shown in FIG. 2B, the example neural network module 252 can include a development module 254 and a radius module 256.

As discussed above, the neural network module 252 can be configured to facilitate developing the neural network based at least in part on the histogram metrics for the plurality of object categories within each region in the set of regions and on the collection of training images. In some implementations, the neural network module 252 can utilize the development module 254 to facilitate the developing of the neural network. In general, a neural network can refer to a computational model used to determine, calculate, and/or approximate one or more functions that can depend on various inputs and that can be generally unknown. Neural networks can, in some cases, be represented as systems of interconnected nodes or elements, which can be referred to as "neurons". Neural networks can be configured to facilitate determining, calculating, computing, and/or approximating, etc., one or more values from one or more inputs. Neural networks can be adaptive and thus can be configured to perform machine learning and pattern recognition. In some embodiments, the neural network can correspond to a convolutional neural network. In general, a convolutional neural network can refer to a feed-forward artificial neural network in which individual neurons are tiled or configured such that the neurons respond to overlapping regions in a visual field. Convolutional neural networks can be utilized as models for image recognition and processing. It should be appreciated that many variations are possible.

The development module 254 can facilitate the developing of the neural network by, for example, generating a table representing the histogram metrics for the plurality of object categories within each region in the set of regions. As discussed previously, in some cases, the object category histogram metrics for each region can be stored in and/or represented by a respective array. The development module 254 can, for example, generate the table based on the respective arrays for the regions in the set of regions. Therefore, the table can be used to look up, retrieve, or otherwise acquire the object category histogram metrics for each region. In some cases, each region and/or its respective object category histogram metrics can be represented by or associated with a respective node in the neural network, such that the neural network can take into consideration which object categories tend to be located within which regions. The neural network can determine one or more patterns or trends (if any) between recognized image objects and in which regions the recognized image object are located.

The development module 254 can also facilitate the developing of the neural network by, for example, providing a location layer within the neural network. The location layer can be associated with the table. In some instances, the location layer can include one or more neural network nodes associated with at least some regions whose histogram metrics are represented in the table. In general, the neural network can include, but is not limited to, an input layer, one or more hidden layers, and an output layer. In some implementations, the location layer associated with the table can correspond to a hidden layer in the neural network. Accordingly, in one example, when the neural network takes as input an image and a region associated with the image, the neural network can utilize (at least in part) the location layer and the histogram metrics to produce an output indicating likelihoods of any recognized objects in the image. Again, there can be many variations and other possibilities.

Moreover, the development module 254 can further facilitate the developing of the neural network by training the neural network based at least in part on the collection of training images. Since the training images in the collection are already known to be associated with recognized objects (i.e., ground truth), the development module 254 can cause the neural network to learn from the training images. In some implementations, the training of the neural network can utilize one or more backpropagation processes. For instance, each region in the set of regions can be associated with a portion of the neural network via a respective connection in a group of connections and each connection in the group of connections can have a respective weight. In this example, the training of the neural network can include performing one or more backpropagation processes that modify (e.g., adjust, tweak, etc.) the respective weight of each connection in the group of connections. The modifying of the respective weight of each connection in the group of connections can cause the neural network to produce a predicted object recognition output, for a particular training image, that is closer to one or more recognized objects associated with the particular training image (i.e., ground truth).

In some embodiments, the training of the neural network can utilize one or more gradient descent processes. In one example, a gradient can be computed with respect to each weight. The weight can be adjusted in the opposite direction of the gradient, such that the gradient of an error between a predicted output and the ground truth can be reduced or minimized. At each layer of the neural network, a derivative of the error with respect to the output of that layer can be computed to assist in modifying the weights and training the neural network. This can be repeated for a next layer in the neural network and can iterate until the input layer. In some cases, for all parameters (e.g., weights) of each layer, a derivative of the error with respect to the parameters can be calculated for a given image. Then the weights can be modified, adjusted, or tweaked, etc., in the opposite direction. This process can be repeated for another training image in the collection of training images. It should be understood that any suitable number of training image samples can be utilized and that many variations are possible.

In one example, if a particular training image is known to include a recognized dog image object (e.g., ground truth), then there can be a 100% probability that the particular training image includes the recognized dog image object. However, in this example, when the particular training image and its associated region are inputted into an untrained or insufficiently trained neural network, the neural network outputs only a 30% likelihood that that the image includes the recognized dog object. As such, the development module 254 can modify the neural network such that the predicted output will be closer to the 100% probability that the particular training image includes the recognized dog image object. The training of neural network can be performed over many iterations of inputting training images and adjusting the neural network such that the predicted outputs are closer to the known or expected outcomes (i.e., ground truth).

Further, in some embodiments, the radius module 256 can facilitate determining, based at least in part on the training of the neural network, a preferred radius associated with each object category in the plurality of object categories. In some cases, the radius module 256 can modify, adjust, or tweak, etc., radii values within the neural network such that predicted outputs become closer to ground truth values. For example, the radius module 256 can determine that when performing image object recognition for the cat object category, it is suitable to consider an area with a first radius, and that when performing image object recognition for the dog object category, it is suitable to consider an area with a second radius different from the first radius. It should be understood that this example is provided for illustrative purposes and that many variations are possible. For example, the preferred radius can sometimes correspond to an optimal radius for each object category. Moreover, in some instances, the radius module 256 can keep track, store, and/or maintain the respective preferred radius for each object category.

Figure 3A:
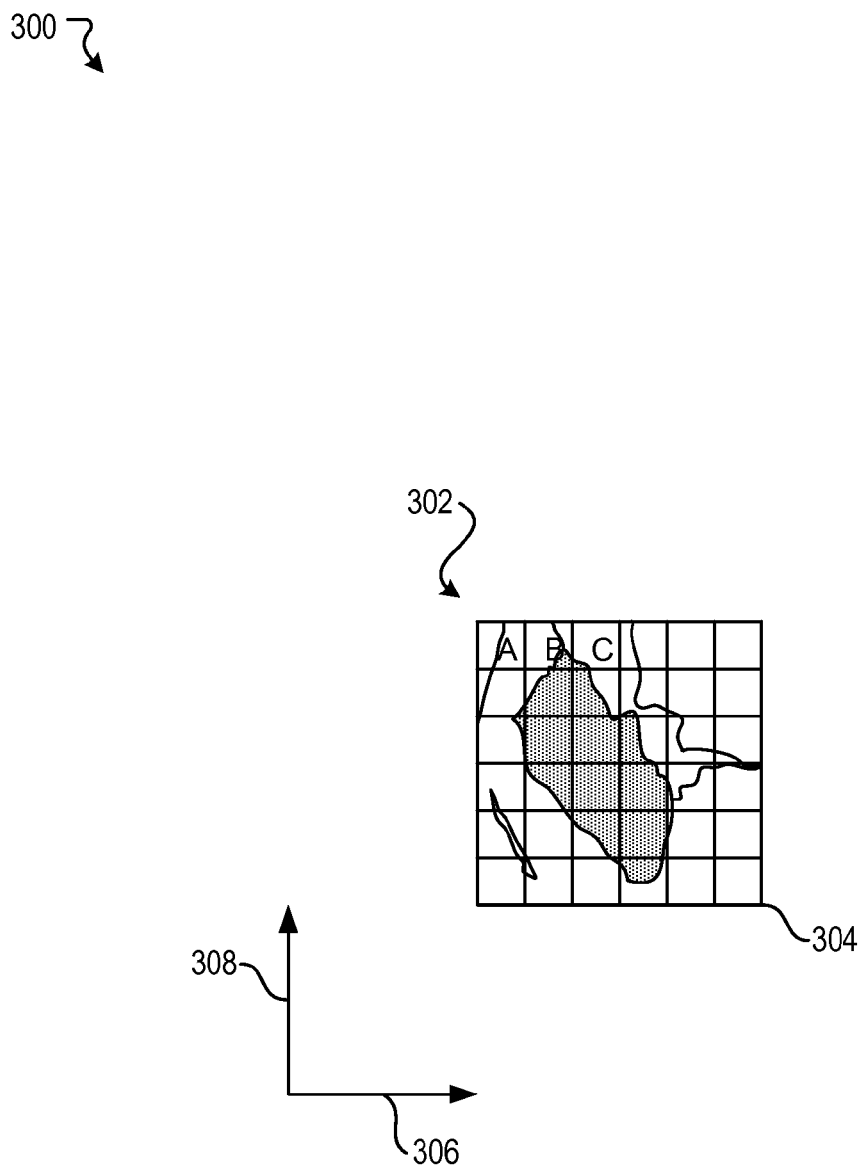
FIG. 3A illustrates an example scenario associated with image object recognition based on location information and object categories, according to an embodiment of the present disclosure.

FIG. 3A illustrates an example scenario 300 associated with image object recognition based on location information and object categories, according to an embodiment of the present disclosure. The example scenario 300 illustrates an example geographical area 302, such as a city (or a portion thereof). As shown in FIG. 3A, an example set of regions 304 corresponding to the geographical area 302 can be identified.

In the example scenario 300, the set of regions 304 can be represented by a grid. Each region in the set of regions can correspond to a box or cell within the grid. The regions can be provided in two dimensions, with respect to a horizontal axis 306 and a vertical axis 308. For illustrative purposes, three of the regions or cells are labeled as "A", "B", and "C" (or Region A, Region B, and Region C), while labels for the remaining regions are omitted for sake of brevity. In this example, the set of regions 304 includes 36 regions or cells, but it should be understood that any suitable number of regions can be identified and that many variations are possible.

Figure 3B:
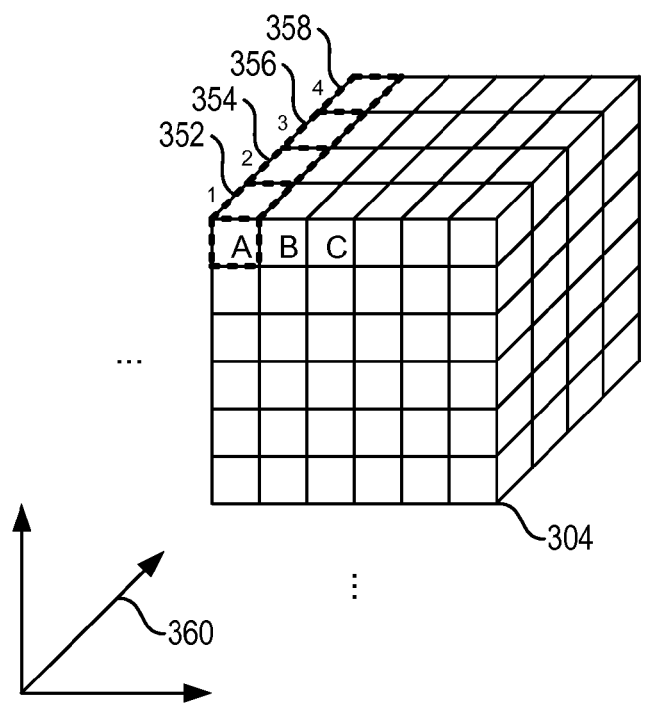
FIG. 3B illustrates an example scenario associated with image object recognition based on location information and object categories, according to an embodiment of the present disclosure.

FIG. 3B illustrates an example scenario 350 associated with image object recognition based on location information and object categories, according to an embodiment of the present disclosure. The example scenario 350 illustrates the set of regions 304 corresponding to the geographical area 302 of FIG. 3A. As shown in the example scenario 350 of FIG. 3B, each region in the set of regions 304 can be provided with a respective array (or vector) extending into a third dimension indicated by a depth axis 360. Each respective array can be used to store or keep track of image object category histogram metrics for each region in set of regions.

In the example scenario 350, a portion of the respective array for Region A can be illustrated by dashed lines. The respective array for Region A can include array elements 352, 354, 356, and 358, as well as other array elements not illustrated. The respective array for Region A can be used to store or keep track of histogram metrics for the plurality of object categories associated with Region A. For example, the first array element 352 can store histogram metrics for a car object category, the second array element 354 can store histogram metrics for a cat object category, the third array element 356 can store histogram metrics for a dog object category, the fourth array element 358 can store histogram metrics for a building object category, and so forth. As such, the number of array elements can correspond to the quantity of the plurality of object categories, which can be predefined or preset. If there are hundreds of object categories, for example, then the arrays for the regions can correspondingly have hundreds of array elements.

In some implementations, based (at least in part) on the arrays for the set of regions, a table representing the histogram metrics for the plurality of object categories within each region can be generated. A location layer associated with the table can be provided within the neural network. The neural network can be trained based at least in part on the collection of training images. It should be noted that the examples provided are for illustrative purposes and that there can be many variations and other possibilities.

Figure 4:
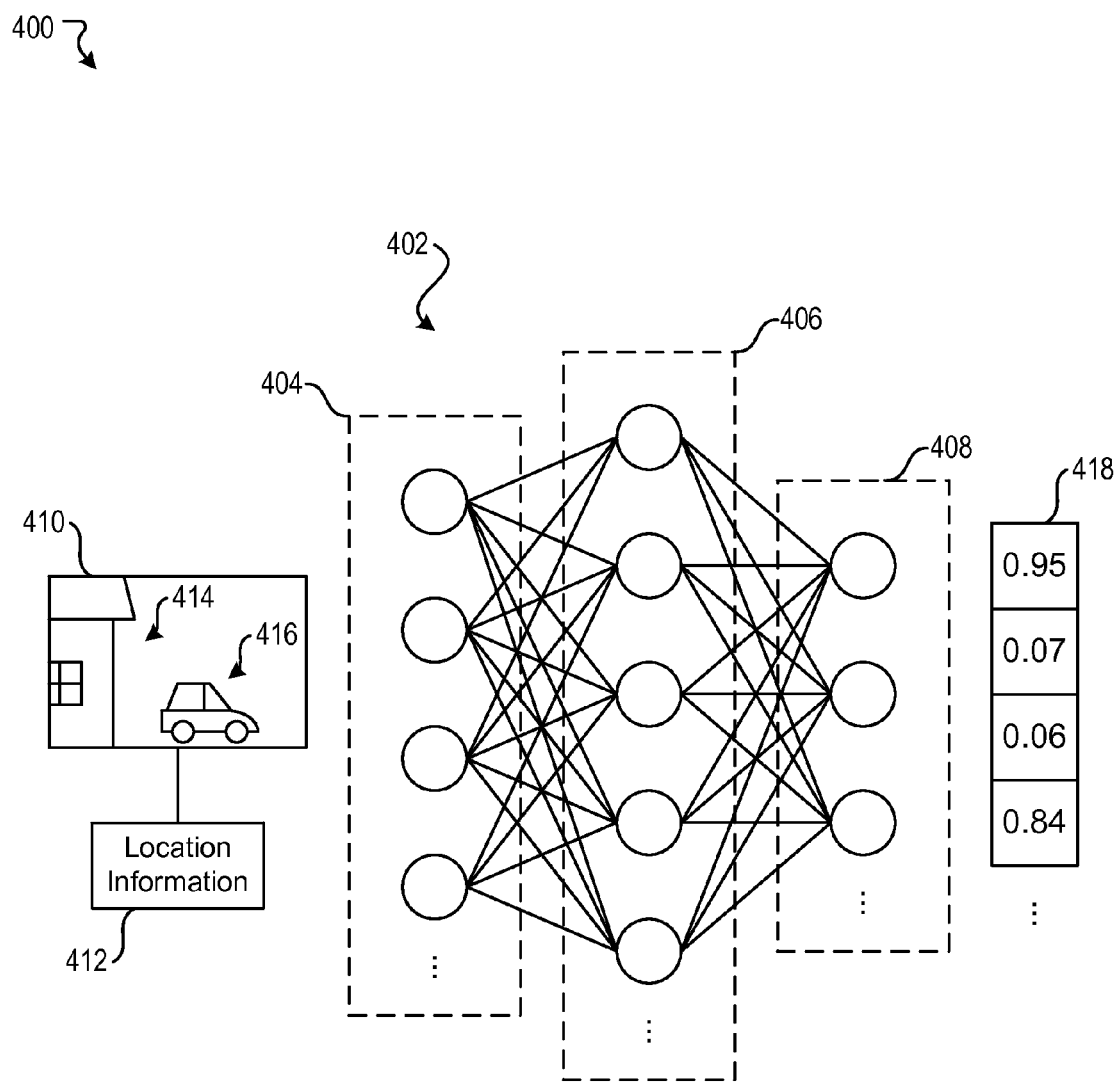
FIG. 4 illustrates an example scenario associated with image object recognition based on location information and object categories, according to an embodiment of the present disclosure.

FIG. 4 illustrates an example scenario 400 associated with image object recognition based on location information and object categories, according to an embodiment of the present disclosure. The example scenario 400 illustrates an example neural network 402, which can be trained using (at least in part) the collection of training images. As shown in FIG. 4, the example neural network 402 can include an input layer 404, at least one hidden layer 406, and an output layer 408.

In the example scenario 400, an image 410 can be inputted into the trained neural network 402 as part of an evaluation phase. The image 410 can include one or more objects, such as a building object 414 and a car object 416, which are unrecognized. The image 410 can also be associated with location information 412, such as GPS coordinates, which can be used to determine with which region in the set of regions the image 410 is associated.

The image 410 and its associated location information 412 can be inputted into the neural network 402 via the input layer 404. The neural network 402 can facilitate object recognition with respect to the image 410. The neural network 402 can provide, via the output layer 408, an output 418 indicating likelihoods that objects in the plurality of object categories are included or represented in the image 410. In this example, the first element of the output 418 can indicate that there is a 95% likelihood that the image 410 includes a car object, the second element of the output 418 can indicate that there is a 7% likelihood that the image 410 includes a cat object, the third element can indicate a 6% likelihood that the image 410 includes a dog object, the fourth element can indicate a 84% likelihood that the image 410 includes a building object, and so forth. As such, the objects 414 and 416 within the image 410 can be recognized by the neural network 402 in this example. Again, it is contemplated that many variations are possible.

Figure 5:
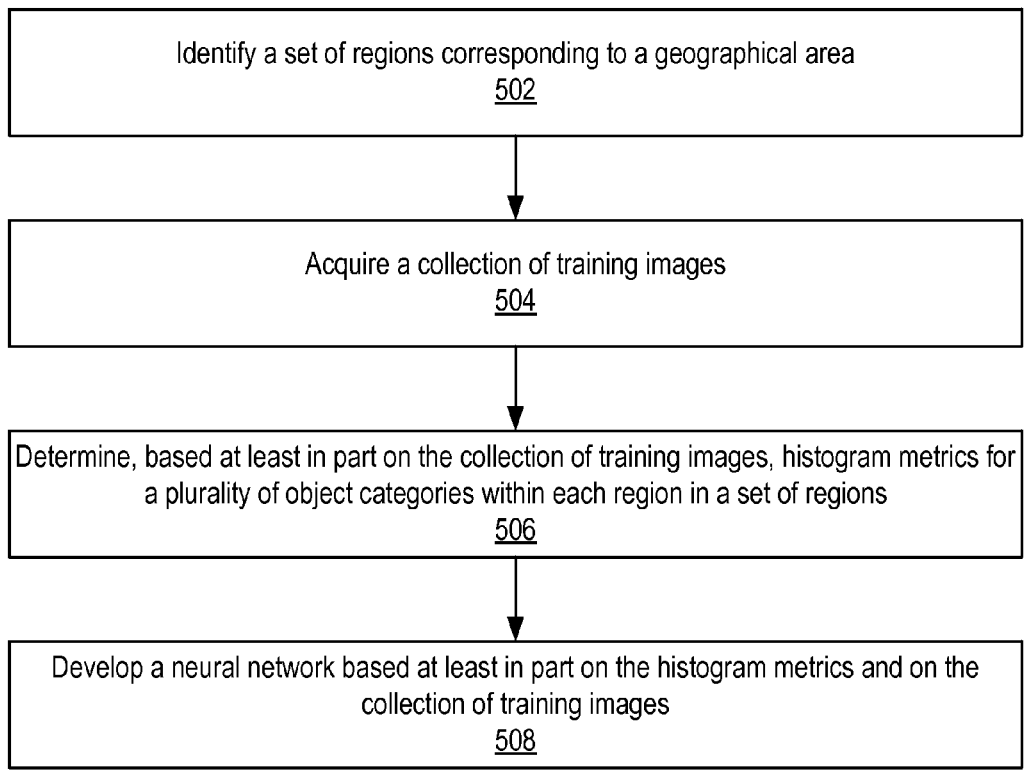
FIG. 5 illustrates an example method associated with image object recognition based on location information and object categories, according to an embodiment of the present disclosure.

FIG. 5 illustrates an example method 500 associated with image object recognition based on location information and object categories, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify a set of regions corresponding to a geographical area. At block 504, the example method 500 can acquire a collection of training images. Each training image in the collection can be associated with one or more respective recognized objects and with a respective region in the set of regions. At block 506, the example method 500 can determine, based at least in part on the collection of training images, histogram metrics for a plurality of object categories within each region in the set of regions. At block 508, the example method 500 can develop a neural network based at least in part on the histogram metrics for the plurality of object categories within each region in the set of regions and on the collection of training images.

FIG. 6A illustrates an example method 600 associated with image object recognition based on location information and object categories, according to an embodiment of the present disclosure. As discussed above, it should be understood that there can be additional, fewer, or alternative steps performed in similar or alternative orders, or in parallel, within the scope of the various embodiments unless otherwise stated.

The example method 600 can facilitate the developing of the neural network. At block 602, the example method 600 can generate a table representing the histogram metrics for the plurality of object categories within each region in the set of regions. At block 604, the example method 600 can provide a location layer within the neural network. The location layer can be associated with the table. At block 606, the example method 600 can train the neural network based at least in part on the collection of training images.

Figure 6B:
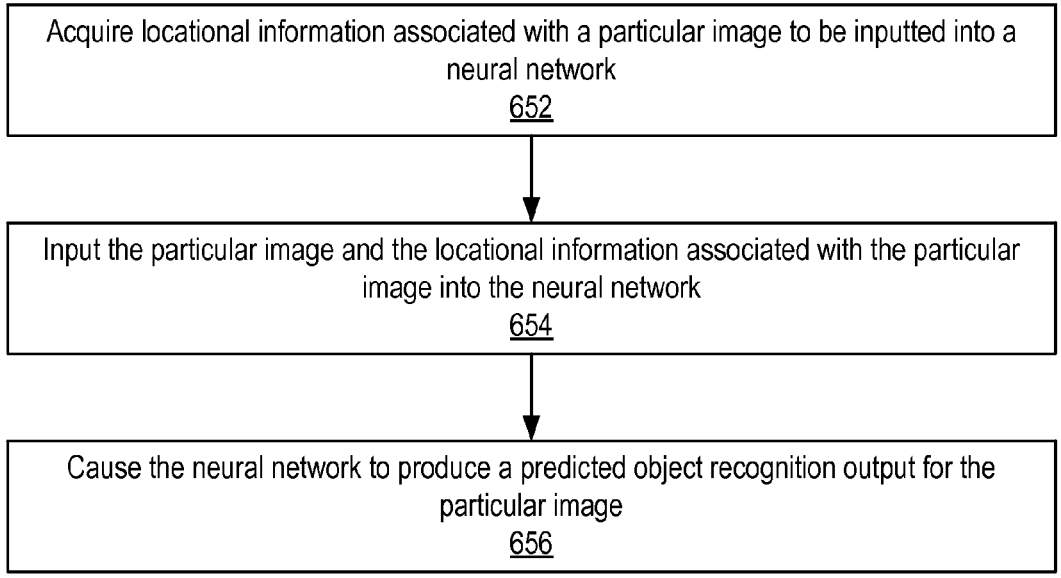
FIG. 6B illustrates an example method associated with image object recognition based on location information and object categories, according to an embodiment of the present disclosure.

FIG. 6B illustrates an example method 650 associated with image object recognition based on location information and object categories, according to an embodiment of the present disclosure. Again, it should be understood that there can be additional, fewer, or alternative steps performed in similar or alternative orders, or in parallel, within the scope of the various embodiments unless otherwise stated.

At block 652, the example method 650 can acquire location information associated with a particular image to be inputted into the neural network. At block 654, the example method 650 can input the particular image and the location information associated with the particular image into the neural network. At block 656, the example method 650 can cause the neural network to produce, based at least in part on the location information associated with the particular image, a predicted object recognition output for the particular image.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
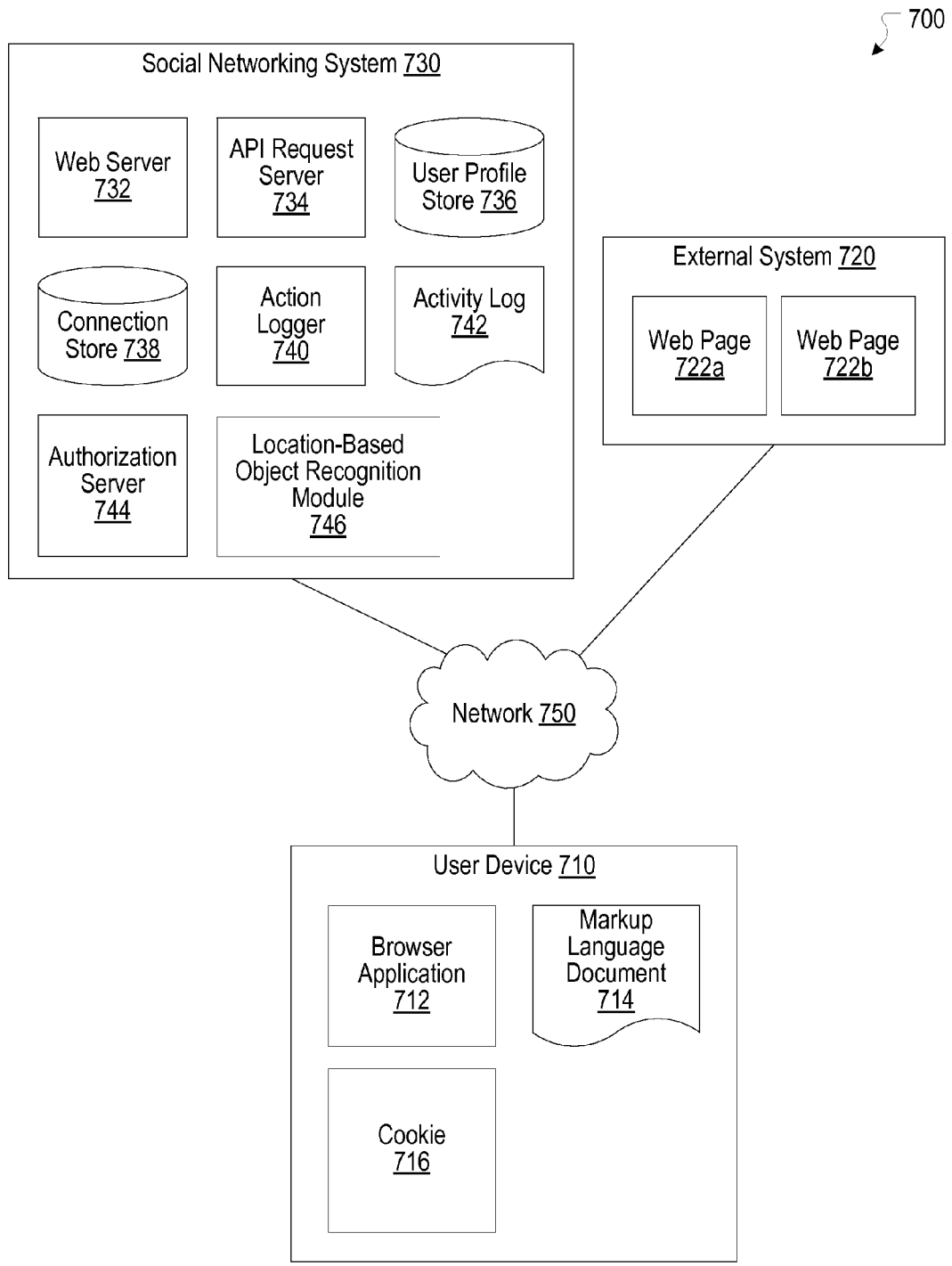
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post"

to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a location-based object recognition module 746. The location-based object recognition module 746 can, for example, be implemented as the location-based object recognition module 102 of FIG. 1. The location-based object recognition module 746 can be configured to facilitate identifying a set of regions corresponding to a geographical area. The location-based object recognition module 746 can also be configured to facilitate acquiring a collection of training images. Each training image in the collection can be associated with one or more respective recognized objects and with a respective region in the set of regions. Moreover, the location-based object recognition module 746 can be configured to facilitate determining, based at least in part on the collection of training images, histogram metrics for a plurality of object categories within each region in the set of regions. Furthermore, the location-based object recognition module 746 can be configured to facilitate developing a neural network based at least in part on the histogram metrics for the plurality of object categories within each region in the set of regions and on the collection of training images. As discussed previously, it should be appreciated that there can be many variations and other possibilities. Other features of the location-based object recognition module 746 are discussed herein in connection with the location-based object recognition module 102.

Hardware Implementation

Figure 8:
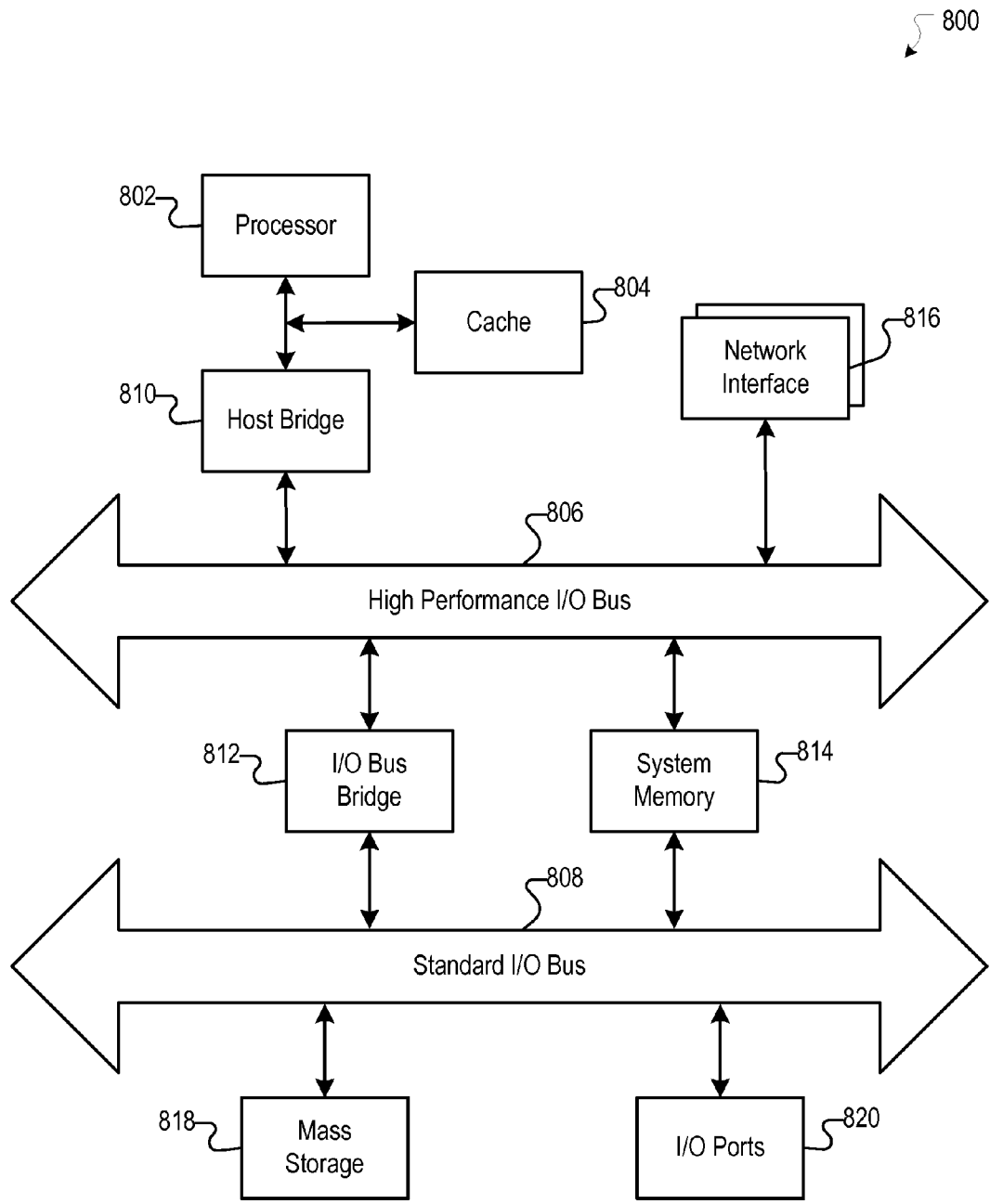
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    identifying, by a computing system, a set of regions corresponding to a geographical area;
    acquiring, by the computing system, a collection of training images, each training image in the collection being associated with one or more respective recognized objects and with a respective region in the set of regions;
    determining, by the computing system, based at least in part on the collection of training images, histogram metrics for a plurality of object categories within each region in the set of regions; and
    developing, by the computing system, a neural network based at least in part on the histogram metrics for the plurality of object categories within each region in the set of regions and on the collection of training images.

2. The computer-implemented method of claim 1, wherein the developing of the neural network further comprises:
    generating a table representing the histogram metrics for the plurality of object categories within each region in the set of regions;
    providing a location layer within the neural network, the location layer being associated with the table; and
    training the neural network based at least in part on the collection of training images.

3. The computer-implemented method of claim 2, further comprising:
    acquiring location information associated with a particular image to be inputted into the neural network;
    inputting the particular image and the location information associated with the particular image into the neural network; and
    causing the neural network to produce, based at least in part on the location information associated with the particular image, a predicted object recognition output for the particular image.

4. The computer-implemented method of claim 2, further comprising:
    determining, based at least in part on the training of the neural network, a preferred radius associated with each object category in the plurality of object categories.

5. The computer-implemented method of claim 1, wherein each region in the set of regions is associated with a portion of the neural network via a respective connection in a group of connections, and wherein each connection in the group of connections has a respective weight.

6. The computer-implemented method of claim 5, wherein the developing of the neural network includes training the neural network, wherein the training of the neural network includes modifying the respective weight of each connection in the group of connections, and wherein the modifying of the respective weight of each connection in the group of connections causes the neural network to produce a predicted object recognition output, for a particular training image, that is closer to one or more recognized objects associated with the particular training image.

7. The computer-implemented method of claim 1, wherein the one or more respective recognized objects associated with each training image are recognized based at least in part on at least one of: 1) an image classification process applied to each training image or 2) one or more respective hashtags provided for each training image.

8. The computer-implemented method of claim 1, wherein the respective region associated with each training image is determined based at least in part on acquiring respective location information for each training image and identifying the respective region corresponding to the respective location information.

9. The computer-implemented method of claim 8, wherein the respective location information for each training image includes Global Positioning System (GPS) data indicating where each training image was captured.

10. The computer-implemented method of claim 1, further comprising:

normalizing the histogram metrics for the plurality of object categories within each region in the set of regions, wherein the histogram metrics are normalized based at least in part on at least one of: 1) a first ratio of a first object quantity for a particular object category within each region relative to a second object quantity for all object categories in the plurality of object categories within each region or 2): a second ratio of the first object quantity for the particular object category within each region relative to a third object quantity for the particular object category within all regions in the set of regions.

11. A system comprising:
at least one processor; and
a memory storing instructions that, when executed by the at least one processor, cause the system to perform:
identifying a set of regions corresponding to a geographical area;
acquiring a collection of training images, each training image in the collection being associated with one or more respective recognized objects and with a respective region in the set of regions;
determining, based at least in part on the collection of training images, histogram metrics for a plurality of object categories within each region in the set of regions; and
developing a neural network based at least in part on the histogram metrics for the plurality of object categories within each region in the set of regions and on the collection of training images.

12. The system of claim 11, wherein the developing of the neural network further comprises:
generating a table representing the histogram metrics for the plurality of object categories within each region in the set of regions;
providing a location layer within the neural network, the location layer being associated with the table; and
training the neural network based at least in part on the collection of training images.

13. The system of claim 12, wherein the instructions cause the system to further perform:
acquiring location information associated with a particular image to be inputted into the neural network;
inputting the particular image and the location information associated with the particular image into the neural network; and
causing the neural network to produce, based at least in part on the location information associated with the particular image, a predicted object recognition output for the particular image.

14. The system of claim 11, wherein each region in the set of regions is associated with a portion of the neural network via a respective connection in a group of connections, and wherein each connection in the group of connections has a respective weight.

15. The system of claim 14, wherein the developing of the neural network includes training the neural network, wherein the training of the neural network includes modifying the respective weight of each connection in the group of connections, and wherein the modifying of the respective weight of each connection in the group of connections causes the neural network to produce a predicted object recognition output, for a particular training image, that is closer to one or more recognized objects associated with the particular training image.

16. A non-transitory computer-readable storage medium including instructions that, when executed by at least one processor of a computing system, cause the computing system to perform:
identifying a set of regions corresponding to a geographical area;
acquiring a collection of training images, each training image in the collection being associated with one or more respective recognized objects and with a respective region in the set of regions;
determining, based at least in part on the collection of training images, histogram metrics for a plurality of object categories within each region in the set of regions; and
developing a neural network based at least in part on the histogram metrics for the plurality of object categories within each region in the set of regions and on the collection of training images.

17. The non-transitory computer-readable storage medium of claim 16, wherein the developing of the neural network further comprises:
generating a table representing the histogram metrics for the plurality of object categories within each region in the set of regions;
providing a location layer within the neural network, the location layer being associated with the table; and
training the neural network based at least in part on the collection of training images.

18. The non-transitory computer-readable storage medium of claim 17, wherein the instructions cause the system to further perform:
acquiring location information associated with a particular image to be inputted into the neural network;
inputting the particular image and the location information associated with the particular image into the neural network; and
causing the neural network to produce, based at least in part on the location information associated with the particular image, a predicted object recognition output for the particular image.

19. The non-transitory computer-readable storage medium of claim 16, wherein each region in the set of regions is associated with a portion of the neural network via a respective connection in a group of connections, and wherein each connection in the group of connections has a respective weight.

20. The non-transitory computer-readable storage medium of claim 19, wherein the developing of the neural network includes training the neural network, wherein the training of the neural network includes modifying the respective weight of each connection in the group of connections, and wherein the modifying of the respective weight of each connection in the group of connections causes the neural network to produce a predicted object recognition output, for a particular training image, that is closer to one or more recognized objects associated with the particular training image.

* * * * *